United States Patent Office 3,839,379
Patented Oct. 1, 1974

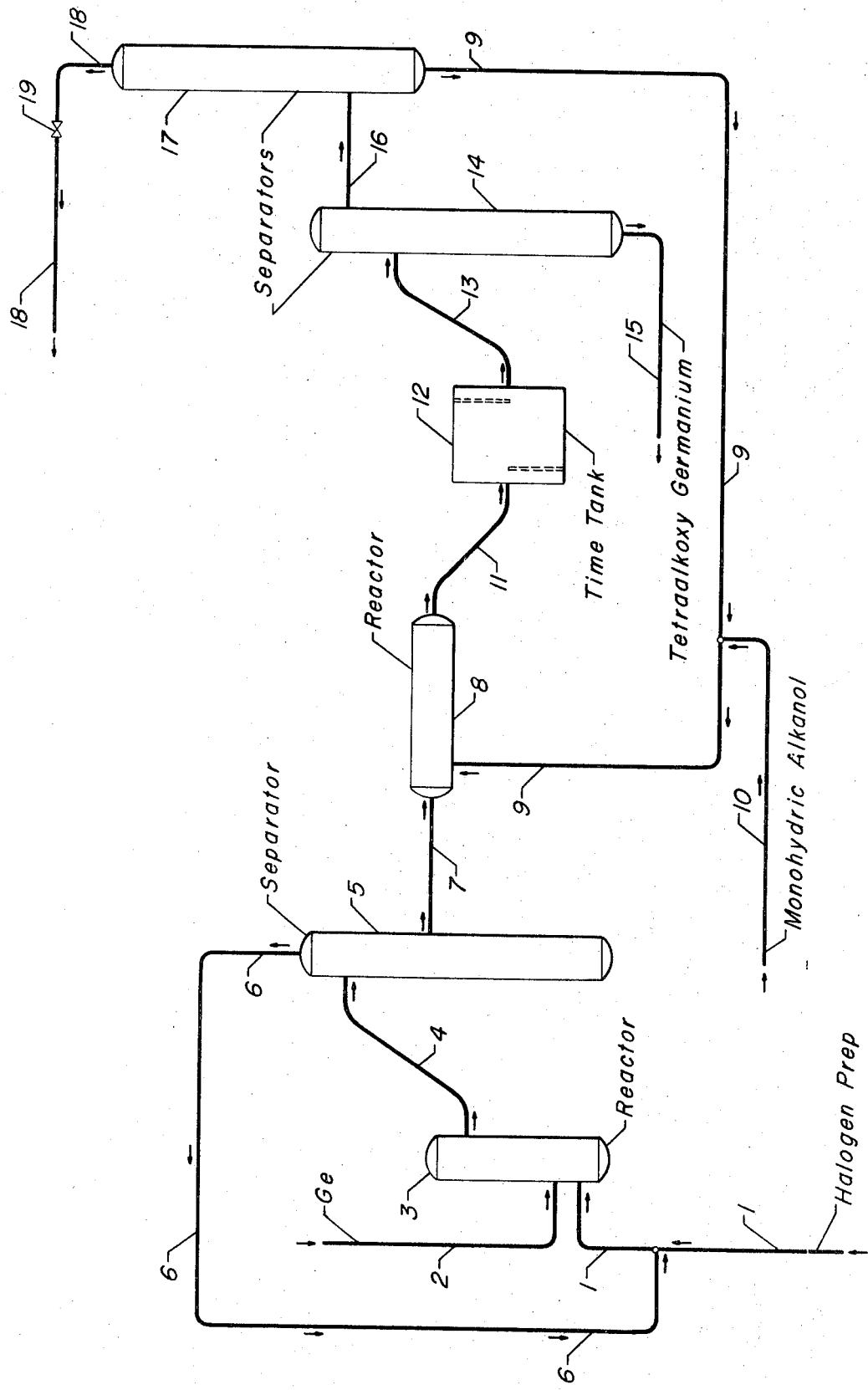

3,839,379
CONTINUOUS TETRAALKOXY GERMANIUM PRODUCTION
Kenneth D. Vesely, Arlington Heights, Ill., assignor to Universal Oil Products Company, Des Plaines, Ill.
Filed Sept. 27, 1973, Ser. No. 401,308
Int. Cl. C07f 7/00
U.S. Cl. 260—429 R       12 Claims

ABSTRACT OF THE DISCLOSURE

A tetraalkoxy germanium is continuously prepared by way of a combination process involving the reaction of germanium with a halogen or a halogen-containing compound to form a tetrahalided germanium with a monohydric alkanol and recovering the resultant tetraalkoxy germanium. The process affords a maximum yield for the continuous preparation of the tetraalkoxy germanium, coupled with substantial purity of said products.

---

This invention relates to a process for the continuous preparation of a tetraalkoxy germanium. More specifically, this invention relates to a process for the continuous preparation of a tetraalkoxy germanium which comprises the treatment of germanium with a halogen or a halogen-containing compound to produce a tetrahalided germanium and reacting said tetrahalided germanium with a monohydric alkanol and recovering the resultant tetraalkoxy germanium.

It has been shown in the prior art that germanium halides or germanium alkoxy compounds can be prepared by methods well-known to the art of germanium chemistry. Germanium halides, including both dihalides and tetrahalides, have been prepared by heating germanium with elemental halogen, the heating of germanium salts, such as barium fluorogermanate to liberate germanium tetrafluoride or the heating of germanium tetrahalides, such as the heating of germanium tetrachloride to produce germanium dichloride. It has also been shown that the halogen moieties may be mixed, such as trifluorochloro germanium or difluorodichloro germanium. It has also been shown that tetraethoxy germanium (also known as tetraethyl germanate) can be prepared from the refluxing of germanium tetrachloride with sodium ethoxide in a medium comprising an alcohol.

In contradistinction to the prior art it has now been discovered that a tetraalkoxy germanium may be continuously prepared from a process which comprises the treatment of germanium with a halogen or halogen-containing compound to produce a tetrahalided germanium and subsequently treat the tetrahalided germanium with a monohydric alkanol and recovering the resultant tetraalkoxy germanium. The utilization of the present invention will give the manufacturer of tetraalkoxy germanium a continuous method for the preparation thereof. The manufacturer of the tetraalkoxy germanium will be encouraged to reduce the cost of production and thereby the cost of the final tetraalkoxy germanium as a result of the continuous utilization of the orginal capitalization of equipment.

The desired products of the continuous process of this invention, namely, the tetraalkoxy germaniums, may be utilized in the chemical industry in many ways. For example, tetraethoxy germanium may be used as the starting material in the preparation of certain germanium catalysts by methods known to the art of catalyst preparation. Other tetraalkoxy germaniums, such as isopropoxy germanium, may be utilized so as to produce other germanium products, such as germanium hydride, in an expedient manner.

It is therefore an object of the invention to provide a continuous process for the preparation of a tetraalkoxy germanium.

A further object of this invention is to provide a continuous process for the preparation of a tetraalkoxy germanium which would permit the recovery of the desired compound in a more pecuniarily rewarding manner.

In one aspect an embodiment of this invention resides in the continuous process for the preparation of a tetraalkoxy germanium which comprises the steps of: (a) reacting germanium with a halogen or a halogen-containing compound in a first reaction zone at a temperature in the range of about 71° C. to about 104° C. and a pressure in the range of from about 1 atmosphere to about 100 atmospheres; (b) separating unreacted halogen or halogen-containing compounds from the first reaction zone effluent to produce a germanium tetrahalide-containing first liquid phase; (c) reacting at least a portion of the said first liquid phase in a second reaction zone with a monohydric alkanol at a temperature of about 0° C. to about 100° C. and a pressure in the range of about −1 atmosphere to about 100 atmospheres, in order to produce a second liquid phase; and, (d) separating the resultant second reaction zone effluent in a second separation zone to produce a tetraalkoxy germanium-containing liquid phase and a hydrogen halide-containing principally vaporous phase, and recovering said tetraalkoxy germanium liquid phase.

A specific embodiment of this invention resides in a process for preparing tetraethoxy germanium which comprises the steps of: (a) reacting germanium with anhydrous hydrochloric acid in a first reaction zone at a temperature in the range of from about 93° C. to about 104° C. and a pressure in the range of from about atmospheric to about 100 atmospheres; (b) separating the tetrachloride germanium effluent from any unreacted hydrochloric acid to produce a tetrachloride germanium-containing first liquid phase; (c) reacting at least a portion of the tetrachloride germanium liquid phase in a second reaction zone with ethanol at a temperature of about 0° C. to about 100° C. and a pressure in the range of from about −1 atmosphere to about 100 atmospheres in order to produce a second liquid phase; and, (d) separating the resultant second reaction zone effluent comprising tetraethoxy germanium from the hydrogen chloride-containing principally vaporous phase in a second separation zone to produce the tetraalkoxy germanium liquid phase which is recovered at the end of said separation.

Other objects and embodiments will be found in the following further detailed description of the present invention.

As hereinbefore set forth the present invention is concerned with a process for the continuous preparation of a tetraalkoxy germanium by treatment of germanium with a halogen or a halogen-containing compound to produce a tetrahalided germanium, reacting said tetrahalided germanium with a monohydric alcohol and recovering the resultant tetraalkoxy germanium. The continuous process is effected under various reaction conditions which would include a temperature of from 71° C. to about 104° C. and a pressure of from about 1 atmosphere to about 100 atmospheres in the first reaction zone, a temperature of from about 0° C. to about 100° C. and a pressure of from about −1 atmosphere to about 100 atmospheres in the retention vessel (time-tank). When super atmospheric pressures are employed, said pressures are afforded by the introduction of a substantially inert gas such as nitrogen, helium, argon, krypton, etc. Other physical conditions necessary for the proper maintenance of continuous process will include the maintenance of temperatures and pressures in various zones so as to regulate the flow of the process as well-known in the art of chemical manufacturing. Another variable condition which is employed in the continuous process for the preparation of the tetraalkoxy germanium is the amount of reactants, the halogen or halogen-containing compound and the monohydric alkanol being present in a mol ratio of 4 mols of halogen or halogen-containing compound and 4 mols of monohydric alkanol to every mol of germanium present. It is within the scope of the hereinbefore set forth invention that excess quantities of halogen or halogen-containing compound and monohydric alkanol may be utilized so as the guarantee the maximum percentage of tetraalkoxy germanium per quantity of germanium charged to the process.

Examples of suitable halogens or halogen-containing compounds which are utilized as one of the starting materials in the process of this invention include, in particular, elemental fluorine, elemental chlorine, elemental bromine, elemental iodine, elemental astatine, hydrochloric acid, hydrofluoric acid, hydrobromic acid, hydrogen iodide, anhydrous hydrogen bromine, anhydrous hydrogen iodide, anhydrous hydrochoric acid, anhydrous hydrofluoric acid, etc.

Examples of monohydric alkanols which may be used in the second reaction zone of the process of the present invention would include those alkanols which possess a carbon number of from 1 to about 15, such as methanol, ethanol, butanol, propanol, isopropanol, isobutanol, pentanol, isopentanol, hexanol, heptanol, octanol, nonanol, decanol undecanol, dodecanol, tridecanol, tetradecanol, pentadecanol, pentanol-2, hexanol-2, heptanol-3, heptanol-2, nonanol-2, decanol-2, etc.

The resultant tetraalkoxy germaniums which may be prepared according to the continuous process of the present invention, would include tetramethoxy germanium, tetraethoxy germanium, tetrapropoxy germanium, tetraisopropoxy germanium, tetrabutoxy germanium, tetrapentoxy germanium, tetrahexoxy germanium, tetraheptoxy germanium, tetraoctoxy germanium, tetranonoxy germanium, tetradecoxy germanium, tetra-2-hexoxy germanium, tetra-3-heptoxy germanium, etc.

It is understood that the aforementioned halogens, halogen-containing compounds, monohydric alkanols and tetraalkoxy germaniums are only representative of the class of compounds which may be employed and that the present invention is not necessarily limited thereto.

The present invention will be further illustrated with reference to the accompanyng drawing which illustrates a simplified flow diagram in which such details as pumps, instrumentation and controls, heat exchange and heat recovery circuits, valving, start-up heaters, start-up lines and similar hardware have been omitted as being nonessential to an understanding of the techniques involved. The use of such miscellaneous appurtenances, to modify the process, are well within the purview of one reasonably skilled in the art.

Referring now to the drawing, germanium is charged to the reactor unit 3 through line 2 and a halogen or halogen-containing compound is charged to reactor unit 3 through line 1 in a mol ratio of four mols of halogen or halogen-containing compound per mol of germanium charged through line 2. Reactor unit 3 is maintained at a temperature of from about 71° C. to about 104° C. and a pressure in the range of from about 1 atmosphere to about 100 atmospheres. The tetrahalided germanium is withdrawn from reactor unit 3 through line 4 into separation zone unit 5. Within separation zone unit 5 any excess halogen or halogen-containing compound is removed and the halogen or halogen-containing compound is recycled to reactor unit 3 through line 6 and line 1 while any water in the case of an anhydrous starting material is removed from the system by separation means not shown in the drawing. The tetrahalided germanium is withdrawn from separation zone unit 5 through line 7 and charged to reaction unit 8. Reaction unit 8 is maintained at a temperature of from about 0° C. to about 100° C. and a pressure in the range of −1 atmosphere to about 100 atmospheres. Monohydric alkanol is added to reaction unit 8 through line 9, which is connected to the monohydric alkanol reservoir through line 10 in a proportion of about 4 mols of monohydric alkanol per mol of germanium present. The tetraalkoxy germanium is formed within reactor unit 8 in conjunction with a halogen acid. The tetraalkoxy germanium and the halogen acid are withdrawn from reaction unit 8 through line 11 and charged to vessel unit 12 (time-tank) which is maintained at a temperature in the range of from about 0° C. to about 100° C. and a pressure of about −1 atmosphere to about 100 atmospheres. After residence in vessel unit 12 for a predetermined period of time the tetraalkoxy germanium and the halogen acid are withdrawn from vessel unit 12 through line 13 and charged to separation zone unit 14. The physical conditions of separation zone unit 14 are maintained so as to recover the tetraalkoxy germanium through line 15 and withdraw any excess alcohol and halogen acid through line 16 and charge to separation zone unit 17. Separation zone unit 17 is maintained at physical conditions so as to recover any excess alcohol which is thereafter recycled to reaction unit 8 through line 9 and to recover the halogen acid through line 18 passing through valve 19.

The following examples are given to illustrate the process of the present invention which, however, are not intended to limit the generally broad scope of the present invention in strict accordance therewith.

EXAMPLE I

In this example a continuous process for the production of tetraethoxy germanium is maintained as herein set forth. A stream comprising germanium and a stream of elemental chlorine are charged to a reaction zone containing dilute hydrochloric acid, said reaction zone being maintained at a temperature of 100° C. and a pressure of one atmosphere. Germanium is charged at a rate of 7.5 lbs./hr. and ambient temperature to the reaction zone. The second stream comprising elemental chlorine is charged at a rate of 14.7 lbs./hr. and at ambient temperature. The exothermic reaction is maintained at 100° C. by the evolution of a 21% azeotropic hydrogen chloride and water. The azeotropic hydrogen chloride and 22.2 lbs. of germanium tetrachloride are charged to a separation zone and thereby separated, said separation zone being maintained at 21° C. and atmospheric pressure. The recovered hydrochloric acid is recycled to the reaction zone while any undesirable water is removed. The separated stream comprising the germanium tetrachloride is charged to a second reaction zone at a rate of 22.2 lbs./hr. A second stream comprising ethanol is charge to the second reaction zone at a rate of 77.0 lbs./hr., said second reaction zone is maintained at a temperature of 21° C. and a pressure of one atmosphere. Tetraethoxy germanium and hydrochloric acid are produced, said products being removed in conjunction with any excess ethanol to a second separation zone. The separation zone is maintained at a temperature of about 0° C. to about 20° C. and a pressure of 1 atmosphere to effect the separation of the tetraethoxy germanium from the hydrochloric acid and the excess ethanol. The tetraethoxy germanium is recovered while the hydrochloric acid and excess ethanol are charged to a third separation zone which effects the separation of the hydrochloric acid and the ethanol, said ethanol being recycled to the ethanol stream reservoir for re-utilization in the second reactor zone.

EXAMPLE II

In this example a continuous process for the production of tetraethoxy germanium is maintained as herein set forth. A stream comprising germanium and a stream comprising hydrochloric acid are charged to a reaction zone containing dilute hydrochloric acid, said reaction zone being maintained at a temperature of 100° C. and a pressure of one atmosphere. Germanium is charged at a rate of 7.5 lbs./hr. and ambient temperature to the reaction zone. The second stream comprising hydrochloric acid is charged at a rate of 15.1 lbs./hr. and at ambient temperature. The exothermic reaction is maintained at 100° C. by the evolution of 21% azeotropic hydrogen chloride and water. The azeotropic hydrogen chloride and 22.2 lbs. of germanium tetrachloride are charged to a separation zone and thereby separated, said separation zone being maintained at 21° C. and atmospheric pressure. The recovered hydrochloric acid is recycled to the reaction zone while any undesirable water is removed. The separation stream comprising the germanium tetrachloride is charged to a second reaction zone at a rate of 22.2 lbs./hr. A second stream comprising ethanol is charged to the second reaction zone at a rate of 100 lbs./hr., said second reaction zone is maintained at a temperature of 25° C. and at a pressure of one atmosphere. Tetraethoxy germanium and hydrochloric acid are produced, said products being removed in conjunction with any excess ethanol to a second separation zone. The separation zone is maintained at a temperature of about 0° C. to about 25° C. and a pressure of one atmosphere to effect the separation of the tetraethoxy germanium from the hydrochloric acid and the excess ethanol. The tetraethoxy germanium is recovered while the hydrochloric acid and excess ethanol are charged to a third separation zone which effects the separation of the hydrochloric acid and the ethanol, said ethanol being recycled to the ethanol stream reservoir for re-utilization in the second reaction zone.

I claim as my invention:

1. A process for the continuous preparation of tetraalkoxy germanium which comprises the steps of:
   (a) reacting germanium with a halogen or a halogen-containing compound in a first reaction zone at a temperature in the range of about 71° C. to about 104° C. and a pressure in the range of from about 1 atmosphere to about 100 atmospheres;
   (b) separating unreacted halogen or halogen-containing compounds from the first reaction zone effluent to produce a germanium tetrahalide-containing first liquid phase;
   (c) reacting at least a portion of the said first liquid phase in a second reaction zone with a monohydric alkanol at a temperature of about 0° C. to about 100° C. and a pressure in the range of about −1 atmosphere to about 100 atmospheres in order to produce a second liquid phase; and
   (d) separating the resultant second reaction zone effluent in a second separation zone to produce a tetraalkoxy germanium-containing liquid phase and a hydrogen halide-containing vaporous phase, and recovering said tetraalkoxy germanium liquid phase.

2. The process of Claim 1 further characterized in that said halogen is chlorine.

3. The process of Claim 1 further characterized in that said halogen is bromine.

4. The process of Claim 1 further characterized in that the halogen-containing compound is anhydrous hydrochloric acid.

5. The process of Claim 1 further characterized in that the halogen-containing compound is hydrofluoric acid.

6. The process of Claim 1 further characterized in that said monohydric alkanol is ethanol.

7. The process of Claim 1 further characterized in that said monohydric alkanol is isopropanol.

8. The process of Claim 1 further characterized in that the second liquid phase is retained in a separate time vessel which is maintained at a temperature of about 0° C. to about 100° C. and a pressure of about −1 atmosphere to about 100 atmospheres.

9. The process of Claim 1 further characterized in that the hydrogen halide-containing vaporous phase is separated to produce an alcoholic third liquid phase and a hydrogen halide vaporous phase.

10. The process of Claim 9 further characterized in that at least a portion of the third liquid phase is recycled to the second reaction zone.

11. The process of Claim 1 further characterized in that said tetraalkoxy germanium is tetraethoxy germanium.

12. The process of Claim 1 further characterized in that said tetraalkoxy germanium is tetraisopropoxy germanium.

References Cited
UNITED STATES PATENTS

| | | | |
|---|---|---|---|
| 3,243,447 | 3/1966 | Rinse | 260—429 R |
| 3,278,571 | 10/1966 | Mazdiyasni et al. | 260—429 R |
| 3,479,381 | 11/1969 | Mitchell | 260—429 R |
| 3,652,617 | 3/1972 | Termin et al. | 260—429 R |
| 3,775,453 | 11/1973 | Mazdiyasni et al. | 260—429 R |

OTHER REFERENCES

Bradley, Progress in Inorganic Chemistry, Vol. II (1960), Interscience, New York, N.Y., pp. 303-9.

DANIEL E. WYMAN, Primary Examiner

A. P. DEMERS, Assistant Examiner